United States Patent
Zuevsky

(10) Patent No.: US 11,488,434 B1
(45) Date of Patent: Nov. 1, 2022

(54) ELECTRONIC VOTING SYSTEM WITH CRYPTOGRAPHICALLY MANAGED TRUST

(71) Applicant: Vitaly Zuevsky, London (GB)

(72) Inventor: Vitaly Zuevsky, London (GB)

( * ) Notice: Subject to any disclaimer, the term of this patent is extended or adjusted under 35 U.S.C. 154(b) by 0 days.

(21) Appl. No.: 17/668,051

(22) Filed: Feb. 9, 2022

(51) Int. Cl.
*G07C 13/00* (2006.01)
*H04L 9/32* (2006.01)

(52) U.S. Cl.
CPC .......... *G07C 13/00* (2013.01); *H04L 9/3218* (2013.01); *H04L 2209/463* (2013.01)

(58) Field of Classification Search
None
See application file for complete search history.

(56) References Cited

U.S. PATENT DOCUMENTS

| | | | |
|---|---|---|---|
| 5,878,399 | A | 3/1999 | Peralto |
| 6,607,137 | B2 | 8/2003 | Morales |
| 6,865,543 | B2 | 3/2005 | Gibbs, Sr. |
| 7,197,639 | B1 | 3/2007 | Juels et al. |
| 7,360,702 | B2 | 4/2008 | Haas |
| 7,451,928 | B2 | 11/2008 | Peterson |
| 7,757,950 | B2 | 7/2010 | Seliger et al. |
| 8,560,381 | B2 | 10/2013 | Green et al. |
| 9,836,908 | B2 | 12/2017 | Spanos et al. |
| 11,038,669 | B2 | 6/2021 | Leker et al. |
| 11,228,440 | B2 | 1/2022 | Dechu et al. |

(Continued)

FOREIGN PATENT DOCUMENTS

| | | |
|---|---|---|
| WO | WO 2003/071491 A2 | 8/2003 |
| WO | WO 2009/136717 A2 | 11/2009 |

(Continued)

OTHER PUBLICATIONS

Haibo Yi, "Securing e-voting based on blockchain in P2P network", May 28, 2019 (Year: 2019).*

(Continued)

*Primary Examiner* — Jacob C. Coppola
*Assistant Examiner* — Timothy Paul Sax
(74) *Attorney, Agent, or Firm* — K&L Gates LLP

(57) ABSTRACT

Electronic voting systems and methods use "proof of work" technology to protect casted votes. Voting system comprises a voting platform and a plurality of voter devices. During the election time period, each voter device performs a multiple computational iterations. For each iteration, each voter device produces a voting data block that comprises, for each iteration, the one or more user votes by the user of the voter device in the election and a nonce that is unique for each iteration. The voter devices also compute a measure for each cryptographic digest computed in each iteration. The measure can be a measure of a property or aspect of the cryptographic digest, such as a measure of the number of consecutive bits of the cryptographic digest that are identical. After completion of the multiple iterations, the voter devices transmit to the voting platform, via the data network, the voting data block corresponding to the digest with the best measure of all the calculated cryptographic digests. The voting platform publishes, via the data network, a first database listing, where the first database listing comprises the voting blocks transmitted to the voting platform from the voter devices.

23 Claims, 2 Drawing Sheets

(56) References Cited

U.S. PATENT DOCUMENTS

| | | | |
|---|---|---|---|
| 2002/0128902 | A1 | 9/2002 | Gibbs, Sr. |
| 2009/0106092 | A1 | 4/2009 | Bowers |
| 2009/0159655 | A1 | 6/2009 | Haas |
| 2013/0006562 | A1 | 1/2013 | Feldkamp et al. |
| 2020/0036517 | A1* | 1/2020 | Denham ............... H04L 9/50 |
| 2020/0084041 | A1* | 3/2020 | Xu ...................... H04L 63/123 |
| 2020/0293500 | A1* | 9/2020 | Patil .................. G06F 16/1824 |
| 2022/0156758 | A1* | 5/2022 | Loyd .................... H04L 9/3236 |

FOREIGN PATENT DOCUMENTS

| | | |
|---|---|---|
| WO | WO 2010/015735 A2 | 2/2010 |
| WO | WO 2019/182202 A1 | 9/2019 |
| WO | WO 2020/008445 A1 | 1/2020 |
| WO | WO 2022/020072 A1 | 1/2022 |

OTHER PUBLICATIONS

Dhillon et al, Long Read: How blockchain can make electronic voting more secure, https://blogs.lse_ac.uk/usappblog/2020/09/25/long-read-how-blockchain-can-make-electronic-voting-more-secure/, Sep. 25, 2020, 5 pages.

Bernstein et al, High-speed high-security signatures, Sep. 26, 2011, 23 pages.

Guasch et al, How to challenge and cast your e-vote, 18 pages.

Carpent et al, Temporal Consistency of Integrity-Ensuring Computations and Applications to Embedded Systems Security, Session 8: Trust, ASIACCS' 18, Jun. 4-8, 2018, Incheon, Republic of Korea, pp. 313-327.

Zuevsky, Dreary Labyrinth of Blockchain, https://www.linkedin.com/pulse/drear-labyinth-blockchain-vilaly-zuevsky/. Systems and Interactions, May 13, 2020, 4 pages.

Gabber et al., Curbing Junk E-Mail via Secure Classification, Bell Laboratories, 16 pages.

Liebkind, How Blockchain Technology can Prevent Voter Fraud, Investopedia, Dec. 9, 2020, 6 pages.

* cited by examiner

US 11,488,434 B1

ELECTRONIC VOTING SYSTEM WITH CRYPTOGRAPHICALLY MANAGED TRUST

BACKGROUND

Democracies rely on elections. Elections can be conducted with paper ballots and/or via electronic voting (e-voting). In general, there are two main types of e-voting: (i) e-voting that is physically supervised by representatives of governmental or independent electoral authorities (e.g. electronic voting machines located at polling stations); and remote e-voting via the Internet (also called i-voting) where the voter submits his or her vote electronically to the election authorities, from any location. However, both paper ballots and e-voting are susceptible to fraud. Voting systems where the final tabulations and outcomes have a higher quality of trust are needed.

SUMMARY

In one general aspect, the present invention is directed to an electronic voting system with cryptographically managed trust. The voting system can use "proof of work" technology to protect casted votes. In various embodiments, the voting system comprises a voting platform and a plurality of voter devices. The voting platform comprises one or more servers. Each voter device comprises at least one processor, and each of the plurality of voter devices is in communication with the voting platform via a data network. During the election time period, each voter device performs a multiple computational iterations. For each iteration, each voter device produces a voting data block that comprises, for each iteration, the one or more user votes by the user of the voter device in the election and a nonce that is unique for each iteration. The voter devices also compute a measure for each cryptographic digest computed in each iteration. The measure can be a measure of a property or aspect of the cryptographic digest, such as a measure of the number of consecutive bits of the cryptographic digest that are identical. After completion of the multiple iterations, the voter devices transmit to the voting platform, via the data network, the voting data block corresponding to the digest with the best measure of all the calculated cryptographic digests. The voting platform publishes, via the data network, a first database listing, where the first database listing comprises the voting blocks transmitted to the voting platform from the voter devices.

The voting system of the present invention can provide significant technological advantages compared to existing voting systems, including existing e-voting systems. Each published voting data block for each voter can comprise the nonce that led to the best measure of the cryptographic digest for that voting data block comprising voter's votes. The nonce in the published voting data block is proof of work by the voter device over the voting data block comprising votes by the voter, such that the work over each published voting data block is trivial to verify and practically impossible to demonstrate or prove without performing the iterations. Thus, the proof of work promotes the integrity of the election by deterring forged votes. Also, the amount of work can be adaptive based on the computational power or capabilities of the voter device, for example. Voter devices with greater computational power may perform a greater number of the iterative computations in comparison to voter devices with lesser computational power. In another example, amount of work can be adaptive based on amount of time a voter was prepared, as a matter of their good will, to invest to guard integrity of the election.

These and other advantages and benefits that are realizable through embodiments of the present invention will be apparent from the description to follow.

FIGURES

Various embodiments of the present invention are described herein by way of example in connection with the following figures.

DESCRIPTION

Figure 1:
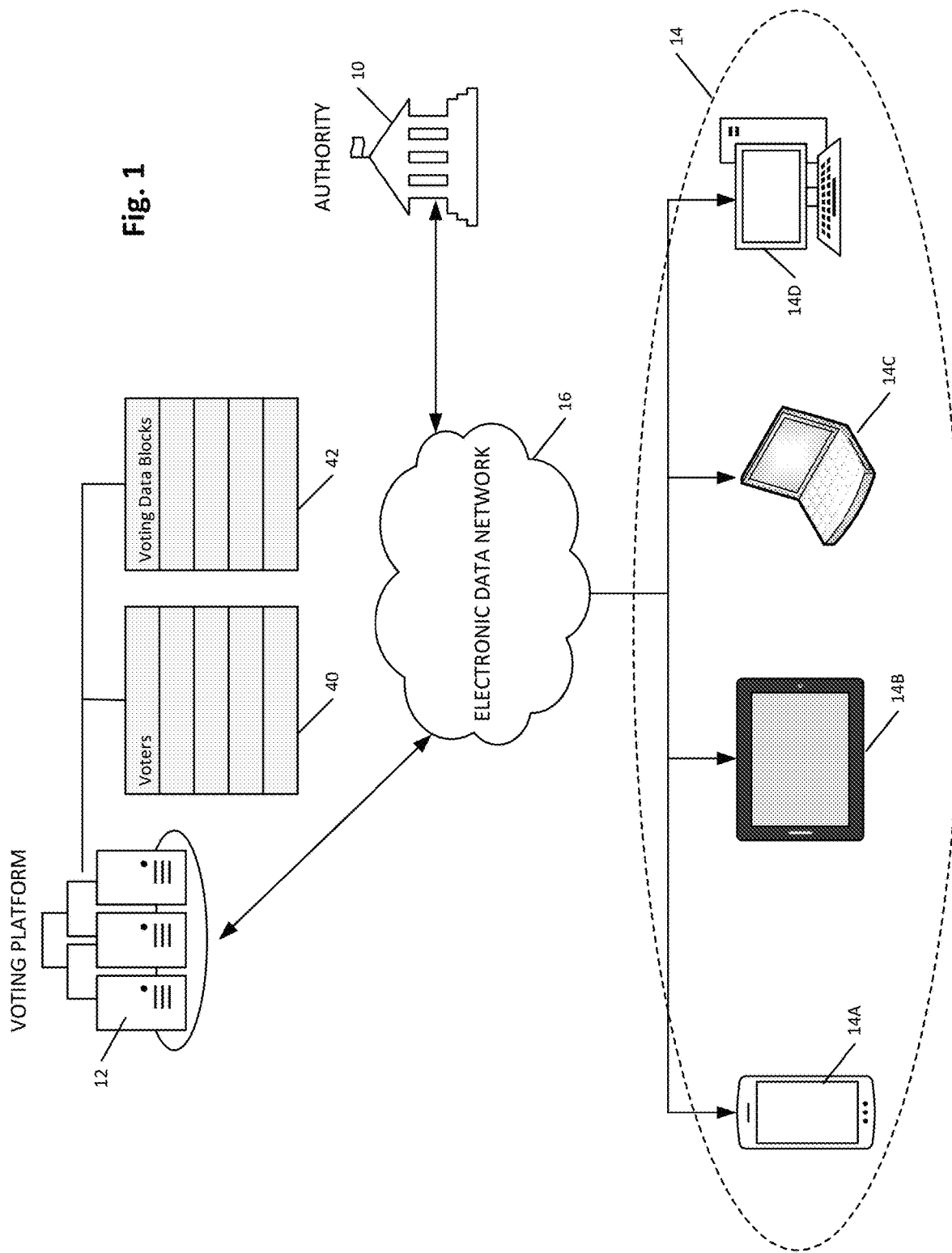
FIG. 1 is diagram of the voting system according to various embodiments of the present invention.

According to embodiments, the present invention is directed to an electronic voting system and associated method for an election to take place of an election time period. The election time period is a finite-duration time period during which voters can vote in the election. The election could be for an elected offices (or offices) and/or a proposition question(s) in a democratic, governmental election. The voting system could also be used for other types of elections where reliability, integrity and trust are important. With reference to FIG. 1, the voting process of the present invention can involve three parties; an authority 10 (e.g., an electoral commission, a governmental portal, or the like); a voting platform 12 outside of the authority's control; and voter devices 14. All three parties may be implemented with computer or CPU-based devices. For example, the authority 10 can have a portal for issuing to the voters one-time, electronic passes to authorize the voters to vote in the election. The voting platform 12 can comprise one or more servers that collect voting data and publish databases or electronic listings during and/or post-election. The voter devices 14 can be any device with a CPU that is capable of performing calculations as described herein and that is capable of communicating with the voting platform 12 via an electronic data network 16, which can be the Internet, for example. As such, as depicted in FIG. 1, the voter devices 14 could be a smartphone 14a, a tablet computer 14b, a laptop 14c, a personal computer 14d, or any other suitable CPU-based device. Each voter in the election could have his/her own voter device 14 or multiple voters can use a common voter device 14, albeit with different registration credentials.

The server(s) of the authority 10 can electronically sign a randomly generated voter ID and share its signed form with the registered or otherwise authorized voter as authorization token for the voter to register in the election. Such authorization can be for a single or multiple elections. By way of construction the tokens can only identify the voters to the authority 10 but not to anyone else, so they can be published in the voter listing 40. On the other hand, anyone (including the platform 12 and election observers) can verify the authority's signature of the token with a public key published by the authority 10 to make sure that the voter was authorized to vote by the authority.

The voting platform 12 severs the link between the authorization token (voter) and the casted votes, fulfilling the anonymity tenet of elections. The voting platform 12 can publish, preferably electronically, such as on a website accessible via the electronic data network 16, two unrelatable lists (or databases). The first list 42 can include the voting data blocks from each voter in a non-voter-identifiable manner. The second list 40 can include a list of voters that lists, for example, the authorization tokens of voters that voted in the election with the voting system. Every published voting data block can include the voter's votes and proof of work by the voter's voter device 14, as described further below. The software run by the voting platform preferably is open-source and observable during the election (and thereafter until the final tabulation of the casted votes is complete) to enhance transparency and integrity.

A voter casting a vote on a voter device preferably runs open-source software, referred to below as "voting software," on the voter's voter device 14 to cast the voter's vote. The platform 12 or some other source(s) can deliver the voting software to the voter devices 14 via the electronic data network 16. For example, the voting software can be an app (e.g., a mobile app) or script in a website hosted by a web server(s). As explained below, the voting software spends some time calculating cryptographic digests based in part on the votes cast by the voter via the voter device 14, such as cyclical cryptographic calculations using a nonce (e.g., a counter). Each voter device 14 (for each voter) must perform some work within the election time period cyclically computing the cryptographic digests, such as testing thousands or millions of nonces to find a nonce that yields a digest of a certain form or with a certain property. The amount of work performed by the voter devices 14 collectively during the election time frame would be greater than could be performed by another party, including the voting platform 12 or authority 10, in the same time period. That way, the proof of work delivered by the voter devices 14 collectively proves that the voter devices 14, and not anyone else, cast the votes. It would be infeasible for, for example, any malicious party to perform the amount of calculations of the voter devices 14 during the election period and, thereby, infeasible for any malicious party to forge many votes.

The calculations performed by the voting software on the voter devices 14 can be calculations using a cryptographic hash function, such as MD5, SHA-512 or BLAKE2, or any other suitable cryptographic hash function having the properties described herein. The hash function takes a block of binary data of arbitrary length as its input and produces a fixed length digest (also called a "hash") as its output. For example, MD5 computes 128-bit digests; SHA-512 computes 512-bit digests; BLAKE2 digests can be configurable and up to 64 bytes (for BLAKE2b). The hash function preferably has two properties. First is collision resistance; if input blocks are different, then the output digests are most likely different. Second is the avalanche effect; if the difference between any two input blocks is minimal (i.e., a single bit is different), then the corresponding digests are significantly dissimilar.

The input block, otherwise referred to as "voting data block," for each cyclic cryptographic computation can be comprised of at least a data structure that captures the voter's votes in the election and a nonce. The data structure stays the same for each cyclic cryptographic computation, whereas the nonce changes (e.g., increments) for each cycle so that the digest is highly likely to be different for each computation. Any suitable data structure that captures the voter's vote(s) in the election can be used. For example, if there are multiple separate elections or proposition questions on the ballot in the electron, the data structure should capture how the voter voted in each of the multiple elections. Another example producing multiple votes by a voter can be ranked-choice voting, where a plurality of ballot options are ranged by the voter in order of preference, e.g. the most preferable option is placed first and the least preferable option is placed last. The voter can cast the votes via the voting software, which can be an app running on the voter device or script on a website hosted, for example, by the voting platform 12. In any case, the voting software captures the voter's votes in the data structure to be used as part of (e.g., along with the nonce) the input block to the hash function. The data in the input voting data block can further comprise auxiliary data generated by the voter device 14 and/or by the voting platform 12.

The voting software can iterate through cryptographic computations, using the varying voting data blocks (which vary due to the varying nonce) for each iteration/cycle, until a stopping criteria is met. The stopping criteria can be, for example, that the number of iterative computations by the voting software exceeds a limit; that the time spent by the voting software computing the iterative cryptographic digests exceeds a time limit; that a digest produced in the last cycle has a sufficient irregularity measure or bears sufficient resemblance to a template (see below); that a user (e.g., a voter) of the voter device completes a task (or a series of tasks) on the voting device; and/or another other suitable stopping criteria. Examples of a task by the user is completion of a challenge provided to the user/voter via the voter device or the user triggering an input on a user interface provided by the voting software that the user has waited long enough for the user's voter device to perform the iterations.

Throughout the iterations, the voting software tracks the nonce that led to the "best" computed digest. The "best" computed digest can be a computed digest with the best (e.g., greatest) measure of a property of the computed digest. As one example, the property may be a measure of how many consecutive zero bits there are at the beginning of the computed digest. The "best" computed digest in such an embodiment is the digest with the most consecutive leading zero bits. In other embodiments, the measure can be the number of consecutive 0s at the end of the computed digest or some other specified portion of the digest. The "best" computed digest in such one other embodiment is the digest with the most consecutive trailing zero bits. In other embodiments, the measure can be the number of is at the beginning (or end) of the computed digest. In yet other embodiments, the measure can be the number of bits at the beginning (or end) of the computed digest that are different than the bit before (e.g. a sequence of 0101 has a measure of 3 because there are three consecutive 0-1 or 1-0 transitions in the sequence). The "best" digest in these embodiments is the digest that has the greatest number of the desired property (e.g., leading or trailing 1s, leading or trailing 01 or 10 transitions, etc.).

The nonce changes for each iteration/cycle and a nonce should not be repeated across the iterations. For example, the nonce could be a counter that is incremented by one every iteration/cycle. The properties of the hash function (e.g., collision resistance and avalanche effect) ensure that every bit of the computed digests appears random, so the probability of any specific bit configuration in, for example, a 128-bit digest is $(0.5)$ to the 128th power. Consequently, for example, if a chosen template is 128 bits long, to come across a nonce leading to a digest matching that template exactly would require, on average, 2 to the 128th power (i.e., $2^{128}$) iterative computations to be performed—enormous body of work.

The proof of work performed by each voter device is the nonce that yields a digest with a great (that is, large) measure for the desired property (e.g., many consecutive leading zero bits in the digest). It is proof because it is trivial for a verifier, e.g., the voting platform 12 or a third party observer, to feed the voting data block into the applicable hash function to compute the digest and see how much computational work has been done (e.g., large number of consecutive leading 0s would imply 2 to that number's power of computation cycles having been performed). On the other hand, there is no practical way for a malicious actor to guess the nonce in a tampered voting data block that would equally yield a digest with many consecutive leading 0s (or other property as the case may be).

Figure 2:
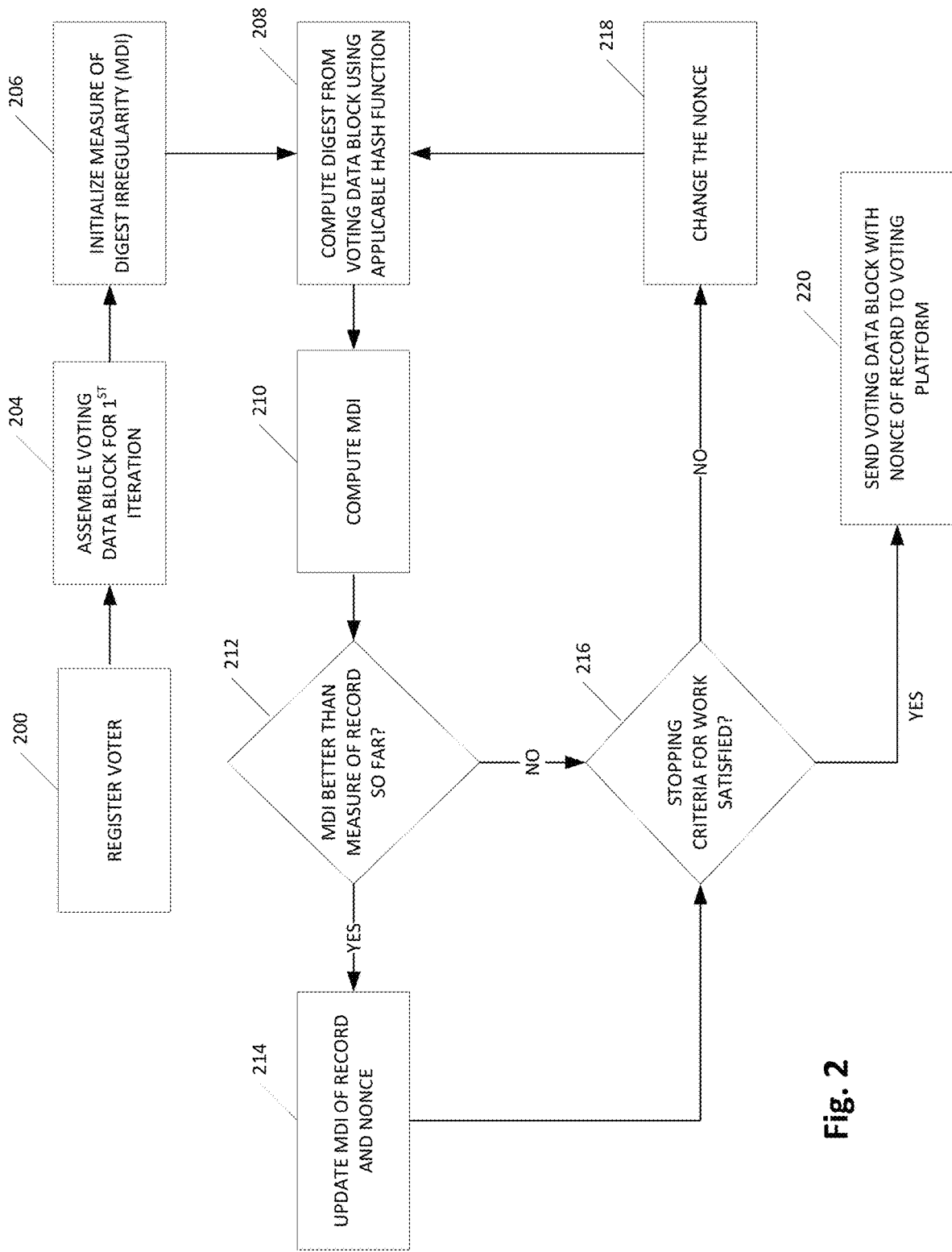
FIG. 2 is a flowchart of a process flow performed by a voter device of the voting system of FIG. 1 according to various embodiments of the present invention.

FIG. 2 is a flowchart depicting the process flow of a voter device 14 operating the voting software according to various embodiments. The depicted embodiment assumes that the measure for the computed digests is the number of consecutive identical bits in the digest. That measure is referred to below as a "measure of digest irregularity," or "MDT," for purposes of explaining the embodiments clearly and succinctly. At step 200, after opening the voting software app or navigating to the voting website, the voter can enter an input to register the voter to vote in the election. To register, the voter might input, for example, their authorization token issued by the authority 10 and/or email address and/or phone number. The voting platform can then verify the token as described above and/or send, for example, a one-time pass code to the email address or phone number (e.g., in a text message) to verify that mode of identification. Besides, a voter may input his/her authorization token using various modalities. For example, the voter could type the alphanumeric sequence into the appropriate input field of the user interface provided by the voting software (app or website). Also, the token could be in a form of QR code that the voter scans with his/her voter device. Also, the voting software could be integrated with a software gateway to a system of the authority 10, so that the token could be passed from the authority directly, when the voter authenticates themselves to the authority system with relevant credentials. Also, the voter could enunciate the alphanumeric code and the voting software could recognize the voter's speech to identify the voter's token.

In various embodiments, prior to the election, the authority 10 transmits the one-time pass credentials to the voting platform 12. When the voter, at his/her voter device 14, enters his/her one-time pass credentials, the voting platform 12 can verify that the voter is authorized to vote in the election by comparing the voter's pass to the list of the authorized credentials. If the voting platform receives the same one-pass credentials twice in the voting time period, the voting platform 12 cannot permit the second occurrence, so that there is only one vote per one-time pass. The authority 10, the voting platform 12, or some other source may transmit the one-time passes to the voters prior to the election time period. The passes may be transmitted to the voters in, for example, an email or a text message.

Next, at step 204, the voting software assembles the voting data block for the first iteration of the hash computations. The first voting data block includes the casted vote(s) by the voter in the election and a first value of the nonce. As mentioned before, the ballot could comprise elections for one or more government offices, proposition questions, etc. The voter's vote(s) can be captured by the voting software in a data structure, such that the data structure (sequence of bits) identifies how the voter voted for each office or question on the ballot. The length and format of the data structure can vary depending on the election, for example, and can be specified by the voting platform 12 or configured by election beneficiaries such as the authority 10 for example. The voting software follows the applicable format to capture the voter's casted votes.

The nonce for all iterations can be the same length (i.e., same number of bits). That way, the lengths of the voting data blocks can be consistent across all of the iterations. The voting software assembles the voting data blocks in a consistent manner across all iterations, such as the casted votes data first followed by the nonce for the iteration, or vice versa. Some auxiliary data in the voting data block can follow as a fixed bit sequence for example. Due to the changing nonce, voting data blocks will have different corresponding digests.

Next, at step 206, the voting software initializes the MDI. The initial MDI set at block 206 could be set, for example, to some easily achievable indicator, such as 1, 2, 3 or 4, for example. "Easily achievable" in this context means that it would take very few computational cycles on average to find a digest with 1, 2, 3 or 4, as the case may be, consecutive leading zero bits.

Next, at step 208, the voting software computes the digest for the first voting data block using the applicable hash function. Preferably, each instantiation of the voting software/voter device uses the same hash function. That way, as explained below, a third party monitor of the election can use the applicable hash function to validate the work done by the voter devices 14. Following step 208, at step 210, the voting software computes the MDI for the digest computed at step 208. As described above, the MDI for this embodiment is the number of consecutive identical bits (e.g., 1s) in a specified portion of the digest (e.g., at the end) computed at step 208.

Next, at step 212, the voting software compares the MDI computed at step 210 with the MDI "of record" so far. For the first iteration, the measure of record is the initial value set at step 206. For an iteration after the first iteration, the measure of record is the measure with the greatest MDI value from all of the prior iterations.

If the MDI computed at step 210 is better (e.g., greater) than measure of record so far, the process advances to step 214, where the voting software stores the new, best MDI value computed at step 210 as the new measure of record. Also at step 214, the voting software stores the nonce that was used in the voting data block that produced the digest with this new best MDI. For example, if the Nth iteration led to the greatest MDI value so far, at step 214 the voting software stores the MDI value for the digest of the Nth iteration and also stores the nonce value for the Nth iteration.

If at step 212 the MDI value computed at step 210 is not better (e.g., greater) than the MDI of record so far, the process advances to step 216. The process also advances to step 216 from step 214. At step 216, the voting software determines whether a stopping criteria for the iterative computations has been satisfied. In other words, has the voter device 14 done enough work? Different stopping criteria may be used. One possible stopping criteria is whether a threshold number of iterative computations have been performed. In such an embodiment, if the number of computations performed is greater than the threshold, then enough work has been done. Otherwise, not enough work has been done. In various embodiment, the number of computations that needs to be performed can be great enough such that the number of computations performed by all voter devices 14 collectively during the election time period, for all voters participating in the election, is greater than the number of similar iterative computations that can be practically achieved by a single actor during the election time period. That way, no malicious party could replicate the computations performed by the collection of voter devices 14. In other words, a malicious party could not forge a substantial portion of the votes cast at the voter devices. The threshold number of computations can be different for different types of voter devices 14 and/or non-deterministic in time as long as the election time period stays substantially greater than an interval invested by each voter device into the computational work. For example, devices, such as smartphones, with relatively lower power CPUs may have a lower threshold than voter devices with relatively higher power CPUs (e.g., a laptop or PC). The threshold number of computations may be great enough so that the voter device has to perform computations for several minutes. Other possible stopping criteria are described below.

If at step 216 the voting software determines that the stopping criteria are not met, the process advances to step 218, where the nonce in the voting data block is changed. For example, the nonce could be a counter and at step 218 the nonce is incremented by one count. Then the iterative loop, comprising steps 208, 210, 212, 214, 216, is repeated. Note, that the casted vote data structure in the voting data blocks that captures the voter's votes does not change in the iterations of this loop. Only the nonce is changed for each iteration and is not repeated across any of the iterations. In embodiments where the voting data blocks for the hash computations include additional values/data besides the casted votes' data and the nonce, such additional values/data should also not change in the iterations. Also, the hash function is the same for each iteration.

Once it is determined at step 216 that the stopping criteria is met, the process advances to step 220, where the voting software transmits to the voting platform 12, via the network 16, the voting data block that corresponds to (or produced) the cryptographic digest with the MDI of record (e.g., the cryptographic digest with the "best" or greatest MDI). As described above, the transmitted voting data block would include, according to a publicly specified format, the voter's votes and the nonce that yielded the "best" (or greatest) MDI. The transmitted voting data block could also include the additional data/values in embodiments where they are used. Any interested party as well as the voting platform 12 can extract the casted votes from the transmitted voting data blocks and then accumulate (or tabulate) the votes from across all of the voters to determine the outcomes of the election.

As mentioned above, the voting platform 12 can publish two lists or databases. Either or both can be published and updated throughout the election time period and/or they could be published after the time period for the electron. The list 40 can be the voter list. This can be, for example, a list of the one-pass credentials that the voting platform 12 received (and permitted) from the voters that voted in the election or authorization tokens issued by the authority 10 or any other voter-specific identifiers. The list 42 can be the voting data blocks transmitted to the voting platform at step 220 by each voter device (for each voter). These voting data blocks comprise the casted votes for each voter and also the nonce for the measure of record after the last iteration performed by the respective voter device (i.e., the nonce stored at step 214 following the last iteration performed). Again, a third party monitor of the election could apply the applicable hash function to the listed voting data blocks to confirm that the computed digests have, for example, a satisfactory measure of irregularity (e.g., a good number of consecutive leading 0s) and thereby determine how many work cycles on average were contributed to collective deterring work of the election by each voter device 14. The votes could also be extracted from the listed voting data blocks without revealing the identity of the voter. Preferably, on the other hand, each voter is able to identify their voting data block in the published list and verify that the votes are as casted.

Referring back to FIG. 2, other stopping criteria could be used at step 216 to determine if enough work by the voter devices has been done. For example, the stopping criteria could be expiration of time period for the computations. The time period may be long enough so that the voter device is likely to compute a digest with a significant MDI, e.g., more than an easily achievable number of consecutive leading 0s. The voting software may display a message that it is performing the calculations and asking the voter to stand by or be patient or something similar. Also, the stopping criteria could be completion of one or a series of tasks by the voter on the voter device 14. The task(s) could be a challenge-response task(s), to occupy the voter while the voting software performs the computations. The challenge-response task(s) could be, for example, a CAPTCHA (Completely Automated Public Turing test to tell Computers and Humans Apart) task(s) where the voter has to type the characters displayed in a distorted image or identify the images in a grid of images that include a specified object, like a bus, crosswalk, etc. Other types of tasks could be used to occupy the voter while the voter device performs the computations. Also, as another form of the task, the user interface of the voting software may have a button or input that, when activated by the user/voter, causes the voting software to stop the computations. The stopping criteria, therefore, could be the user performing the task of activating of the "stop computations" input on the user interface or the like. The more computations the voting software performs is generally better (i.e., proof of more work). The user may activate the "stop computations" input when the user is satisfied with the integrity protection for his/her vote.

In various embodiments, the voting data blocks that are the inputs to the hash function have additional values besides the casted vote data and the nonce. Any such additional data/values should be included in the voting data block sent by the voter device 14 to the platform 12 at step 220 of FIG. 2; and should not reveal the identity of the voter in the published voting data block. For example, the additional data/value could comprise a random numbers generated by the voter device 14 and/or received from the platform 12 via the network 16, timestamps obtained from a common source, additional cryptographic hashes and/or signatures, generic information about the voter device 14, etc. For example, using additional data from the voter device can impair the ability of the voting platform (or some other party) to prepare fraudulent voting data blocks in advance. If used, such additional data/values are publically documented and positioned in the voting data block in a known location so that anyone interested can extract all available information from the transmitted voting data blocks and check integrity or conclude the outcomes of the election.

In the embodiment of FIG. 2, the voting software computed the MDI for the computed digests, such as the number of consecutive leading (or trailing) 0s (or 1s) or, more generally, the number of consecutive specified identical bits (0 or 1) counted from a specified bit position of the binary representation of the digest into specified direction (most or least significant bit). As every bit in a digest appears random, many consecutive identical bits make the digest look irregular. In other embodiments, the voting software may compare the computed digests to a specified template. For instance, an arbitrary template could be stipulated as 1-0-0-1-0-1-1-1, which could be the whole or a specified part of the digest. If corresponding bits of some digest are 0-0-1-0-1-1-0-1 then the measure of comparison with the template can be 3 because the second (0), the sixth (1), and the eighth (1) bits match. In other embodiments, the different templates could be used and compared to a different, specified portion of the digest (e.g., a sequence of bits that are not at the beginning or end). In such embodiments, the measure computed at step 210 may quantify how similar (or how dissimilar) the applicable portion of the digest is to the template. Yet in other embodiments, the digest, the template, and method of comparison can be non-binary but with radix 8, 10, or 16 for example.

In various embodiments, therefore, the present invention is directed to voting systems and methods for an election that is conducted over an election time period. The voting system comprises, in various embodiments, a voting platform comprising one or more servers and a plurality of voter devices. Each voter device comprises at least one processor, and each of the plurality of voter devices is in communication with the voting platform via a data network. During the election time period, each voter device is configured to execute code to, for each iteration across multiple iterations: (i) produce a voting data block, where the voting data block for each iteration comprises: (a) one or more user votes in the election by a user of the voter device; (b) a nonce that is unique for each iteration; (ii) calculate a cryptographic digest with a hash function over the voting data block; and (iii) calculate a measure for the cryptographic digest. After completion of the multiple iterations, each voter device transmits to the voting platform, via the data network, the voting data block corresponding to the cryptographic digest with a best measure of all the calculated cryptographic digests. The voting platform publishes, via the data network, a first database listing, where the first database listing comprises the voting data blocks transmitted to the voting platform from the voter devices.

The voting method comprises, in various embodiments, during the election time period, by each of a plurality of voter devices: iteratively, for each iteration across multiple iterations: (i) producing a voting data block, where the voting data block for each iteration comprises: (a) one or more user votes by a user of the voter device; (b) a nonce that is unique for each iteration; (ii) calculating a cryptographic digest with a hash function over the voting data block; and (iii) calculating a measure for the cryptographic digest. After completion of the multiple iterations, the voting method further comprises the step of transmitting to a voting platform, via a data network, for publication by the voting platform via the data network, the voting data block corresponding to the cryptographic digest with a best measure of all the calculated cryptographic digests.

According to various implementations, the voter devices are configured to perform the multiple iterations of calculating the cryptographic digests until a stopping criteria is satisfied. The stopping criteria can be, for example, that the voter device has performed a threshold number of iterations of calculating the cryptographic digests; that the voter device has iteratively calculated the cryptographic digests for a threshold period of time; that a user of the voter device completes a task on the voter device; or that the measure for one of the calculated cryptographic digests has reached a target, such as how the calculated cryptographic digests compare to a template.

In various implementations, each voter device is configured additionally to execute code to, prior to performing the multiple iterations of calculating the cryptographic digests: receive as an input a voter registration from a user of the voter device; and transmit the voter registration to the voting platform, via the data network, where the voting platform is configured to determine, based on the voter registration, whether the user of the voter device is eligible to vote. In such an embodiment, the voting platform can be further configured to publish, via the data network, a second database listing, where the second database listing comprises the voter registrations from eligible voters that the voting platform has received from the voter devices.

In various implementations, the code executed by one of the voter devices comprises code of mobile app installed on the voter device or executable script on a webpage.

In various implementations, the measure is a measure of a property of the cryptographic digests. For example, the measure can be a measure of the number of consecutive bits of the cryptographic digest that are identical; a measure of consecutive zero bits at a pre-specified location of the cryptographic digest; a measure of how the cryptographic digests compare to a pre-specified template; or a measure of bitwise irregularity of the cryptographic digest.

In various embodiments, each nonce in the published voting data blocks is proof of work by the voter devices over the voting data blocks of the voters, such that an amount of work completed over each voting data block is trivial to verify and practically impossible to prove without performing the iterations. In that connection, the cumulative amount of work across the plurality of voter devices is a deterrent against forging votes in the election.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A voting system for an election, wherein the election is conducted over an election time period, the voting system comprising:
   a voting platform comprising one or more servers; and
   a plurality of voter devices, wherein each voter device comprises at least one processor executing instructions, and wherein each of the plurality of voter devices is in communication with the voting platform via a data network, and
   wherein during the election time period, for each voter device, the instructions are executed to:
      for each iteration across multiple iterations:
         produce a voting data block, wherein the voting data block for each iteration comprises:
            one or more user votes in the election by a user of the voter device; and
            a nonce that is unique for each iteration;
         calculate a cryptographic digest with a hash function over the voting data block;

calculate a measure for the cryptographic digest based on a property of the cryptographic digest;

determine whether the measure for the cryptographic digest is greater than a current measure of record and update the current measure of record to the measure for the cryptographic digest when the measure for the cryptographic digest is greater than the current measure of record; and determine whether a stopping criteria is satisfied; and after completion of the multiple iterations based on the stopping criteria being satisfied, transmit to the voting platform, via the data network, the voting data block corresponding to the cryptographic digest with the current measure of record, and wherein the voting platform publishes, via the data network, a first database listing, wherein the first database listing comprises the voting data blocks transmitted to the voting platform from the voter devices.

2. The voting system of claim 1, wherein the stopping criteria is that the voter device has performed a threshold number of iterations of calculating the cryptographic digests.

3. The voting system of claim 1, wherein the stopping criteria is that the voter device has iteratively calculated the cryptographic digests for a threshold period of time.

4. The voting system of claim 1, wherein the stopping criteria is that a user of the voter device completes a task on the voter device.

5. The voting system of claim 1, wherein the stopping criteria is that the measure for one of the calculated cryptographic digests has reached a target.

6. The voting system of claim 1, wherein each voter device is configured additionally to execute code to, prior to performing the multiple iterations of calculating the cryptographic digests:

receive as an input a voter registration from a user of the voter device; and transmit the voter registration to the voting platform, via the data network, wherein the voting platform is configured to determine, based on the voter registration, whether the user of the voter device is eligible to vote.

7. The voting system of claim 6, wherein the voting platform is further configured to publish, via the data network, a second database listing, wherein the second database listing comprises the voter registrations from eligible voters that the voting platform has received from the voter devices.

8. The voting system of claim 1, wherein the instructions executed by one of the voter devices comprises code of mobile app installed on the voter device.

9. The voting system of claim 1, wherein the instructions executed by one of the voter devices comprises executable script on a webpage.

10. The voting system of claim 1, wherein the measure is a measure of the number of consecutive bits of the cryptographic digest that are identical.

11. The voting system of claim 10, wherein the measure is a measure of consecutive zero bits at a pre-specified location of the cryptographic digest.

12. The voting system of claim 1, wherein the measure is a measure of how the cryptographic digests compare to a pre-specified template.

13. The voting system of claim 1, wherein the measure is a measure of bitwise irregularity of the cryptographic digest.

14. The voting system of claim 1, wherein each nonce in the published voting data blocks is proof of work by the voter devices over the voting data blocks of the voters, such that an amount of work completed over each voting data block is trivial to verify and practically impossible to prove without performing the iterations.

15. The voting system of claim 14, wherein a cumulative amount of work across the plurality of voter devices is a deterrent against forging votes in the election.

16. A voting method for an election, wherein the election is conducted over an election time period, the voting method comprising:

during the election time period, for each of a plurality of voter devices:

iteratively, for each iteration across multiple iterations:

producing a voting data block, wherein the voting data block for each iteration comprises:

one or more user votes by a user of the voter device;

a nonce that is unique for each iteration;

calculating a cryptographic digest with a hash function over the voting data block;

calculating a measure for the cryptographic digest based on a property of the cryptographic digest;

determining whether the measure for the cryptographic digest is greater than a current measure of record and updating the current measure of record to the measure for the cryptographic digest when the measure for the cryptographic digest is greater than the current measure of record; and determining whether a stopping criteria is satisfied;

after completion of the multiple iterations based on the stopping criteria being satisfied, transmitting to a voting platform, via a data network, for publication by the voting platform via the data network, the voting data block corresponding to the cryptographic digest with the current measure of record, wherein:

the voting platform comprising one or more servers; and each voter device comprises at least one processor, and wherein each of the plurality of voter devices are in communication with the voting platform via the data network.

17. The voting method of claim 16, further comprising publishing, by the voting platform, via the data network, a first database listing, wherein the first database listing comprises the voting data blocks transmitted to the voting platform from the voter devices.

18. The voting method of claim 17, wherein each nonce in the published voting data blocks is proof of work by the voter devices over the voting data blocks of the voters, such that an amount of work completed over each voting data block is trivial to verify and practically impossible to prove without performing the iterations.

19. The voting method of claim 18, wherein cumulative amount of work across the plurality of voter devices is a deterrent against forging votes.

20. The voting method of claim 16, further comprising, by each voter device, prior to performing the multiple iterations of calculating the cryptographic digests:

receiving as an input a voter registration from a user of the voter device; and transmitting the voter registration to the voting platform, via the data network, wherein the voting platform is configured to determine, based on the voter registration, whether the user of the voter device is eligible to vote.

21. The voting method of claim 20, further comprising publishing, by the voting platform, via the data network, a second database listing, wherein the second database listing comprises the voter registrations from eligible voters that the voting platform has received from the voter devices.

22. The voting method of claim 16, wherein the measure is a measure of bitwise irregularity of the cryptographic digest.

23. The voting method of claim 16, wherein the measure is a measure of a comparison with a pre-specified template for the cryptographic digest.

\* \* \* \* \*